US009444776B2

(12) United States Patent
Albouyeh et al.

(10) Patent No.: US 9,444,776 B2
(45) Date of Patent: Sep. 13, 2016

(54) INTELLIGENT, DYNAMIC E-MAIL SIGNATURE

(71) Applicant: International Business Machines Corporation, Armonk, NY (US)

(72) Inventors: Shadi E. Albouyeh, Raleigh, NC (US); Bernadette A. Carter, Raleigh, NC (US); Jeffrey R. Hoy, Southern Pines, NC (US); Stephanie L. Trunzo, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 14/284,797

(22) Filed: May 22, 2014

(65) Prior Publication Data

US 2015/0341299 A1    Nov. 26, 2015

(51) Int. Cl.
*H04L 12/58* (2006.01)
*H04L 29/06* (2006.01)
*G06F 17/30* (2006.01)
*H04L 29/08* (2006.01)

(52) U.S. Cl.
CPC ......... *H04L 51/22* (2013.01); *G06F 17/30861* (2013.01); *H04L 12/58* (2013.01); *H04L 51/32* (2013.01); *H04L 63/00* (2013.01); *H04L 67/00* (2013.01)

(58) Field of Classification Search
CPC .... G06Q 10/107; G06Q 30/02; G06Q 50/01; H04L 12/58; H04L 12/587; H04L 51/08; H04L 51/22; H04L 51/24; H04L 51/063; H04L 63/08; H04L 63/09; H04L 63/10; H04L 67/00; H04L 63/00; G06F 17/30861
See application file for complete search history.

(56) References Cited

U.S. PATENT DOCUMENTS

| 6,510,453 | B1 | 1/2003 | Apfel et al. |
| 7,865,562 | B2 | 1/2011 | Nesbitt et al. |
| 8,086,968 | B2 | 12/2011 | McCaffrey et al. |
| 2005/0055627 | A1* | 3/2005 | Lloyd ............. G06F 17/21 715/268 |
| 2007/0244977 | A1* | 10/2007 | Atkins ............. G06Q 10/107 709/206 |
| 2008/0040435 | A1 | 2/2008 | Buschi et al. |
| 2008/0189763 | A1* | 8/2008 | Smith ............. H04L 12/587 726/2 |
| 2009/0328081 | A1* | 12/2009 | Bille ............. H04L 63/10 719/330 |
| 2011/0087969 | A1* | 4/2011 | Hein ............. G06Q 10/107 715/752 |
| 2011/0093347 | A1* | 4/2011 | Lindblom ............. G06Q 30/02 705/14.72 |
| 2013/0019289 | A1 | 1/2013 | Gonser et al. |

FOREIGN PATENT DOCUMENTS

WO    0137123 A2    5/2001

OTHER PUBLICATIONS

Borza, P-V, "How to Create a Dynamic Email Signature Coding 4Fun Articles", Posted: Oct. 31, 2006, <http://channel9.msdn.com/coding4fun/articles/How-To-Create-A-Dynamic-Email-Signature>.

"Office Dynamic Outlook 03 / 07 email signature that pulls data from Active Directory", Copyright 2014 Microsoft, Version: 417. 4865.5.0, <http://gallery.technet.microsoft.com/office/b6dfc6d1-5354-4ed0-9856-9547d19ef670>.

"Socialized email signature", An IP.com Prior Art Database Technical Disclosure, IP.com No. IPCOM000226409D, IP.com Electronic Publication: Apr. 3, 2013.

* cited by examiner

*Primary Examiner* — Nicholas Taylor
*Assistant Examiner* — Michael Li
(74) *Attorney, Agent, or Firm* — Gilbert Harmon, Jr.

(57) ABSTRACT

A computer implemented method, computer program product, and system for providing a dynamic, intelligent e-mail signature. In an embodiment, the method includes the steps of receiving an e-mail from a sender, storing the e-mail for later retrieval, assigning a URL representing the e-mail signature and sending the URL to the sender. Further, the method includes the steps of receiving the URL from the e-mail recipient, analyzing the e-mail and social media activities of sender and recipient, determining a signature and sending the signature to the recipient.

17 Claims, 8 Drawing Sheets

INTELLIGENT, DYNAMIC E-MAIL SIGNATURE

BACKGROUND OF THE INVENTION

The present invention relates generally to the field of electronic mail messaging, and more particularly to a signature within an e-mail message.

An electronic mail message (e-mail) is a communication composed on a computer, personal digital assistant, cell phone or other electronic device and transmitted from a sender to a recipient. An e-mail is transmitted from the sending computer and arrives at a recipient computer, whereupon a recipient can view the message. A signature may be included within the body of an e-mail, usually at the end wherein the sender may choose to include a name, job title, an interesting quotation, picture or other closing remark.

Social media activities are understood to comprise postings on social media sites such as Twitter®, web logs (blogs), Facebook®, YouTube®, LinkedIn® professional networking services, and many others. In general, social media sites are web sites used to facilitate networking and communication among people in a public or semi-public, web-based, internet-connected, distributed computing environment. Common features of many social media sites include the ability to post images, hyperlinks and text messages directed at various individuals or audiences as determined by the site and influenced by preferences of the various users.

SUMMARY

Embodiments in accordance with the present invention disclose a computer implemented method, computer program product, and system for providing a dynamic, intelligent e-mail signature. In one embodiment, in accordance with the present invention, the method includes the steps of receiving, by one or more processors, an e-mail from a sender; storing, by one or more processors, the e-mail for later retrieval; assigning, by one or more processors, a URL representing an e-mail signature; associating, by one or more processors, the URL with the e-mail; and transmitting, by one or more processors, the URL to the sender.

DETAILED DESCRIPTION

Embodiments in accordance with the present invention disclose a method and system to automatically insert a dynamic, intelligent signature in an e-mail upon first display or otherwise opening of an e-mail, and to automatically update the signature with newer information, if available, upon each subsequent display or otherwise opening of the e-mail by the recipient.

Embodiments in accordance with the present invention include implementations that analyze the social media relationship between sender and recipient as well as their social media activities, and identify commonalities between them. Embodiments in accordance with the present invention determine an intelligent e-mail signature, meaning that the signature is relevant to the sender, meaningful to the recipient, and appropriate to their social relationship and the context of the e-mail message.

Furthermore, the e-mail signature is dynamic, which shall be understood to mean that each time the e-mail is displayed or otherwise opened, the signature may automatically be updated to take into account the latest information regarding social media activities by the sender and recipient.

Client-server architecture in the field of computing is a distributed application structure that partitions tasks or workloads between the providers of a resource or service, called servers, and service requesters, called clients. Often clients and servers communicate over a computer network on separate hardware. Embodiments in accordance with the present invention recognize that both client and server may be operationally coupled within the same system. A server may host one or more server programs which share their resources with clients. A client requests a server's content or service function. Clients therefore initiate communication sessions with servers which await incoming requests.

Figure 1:
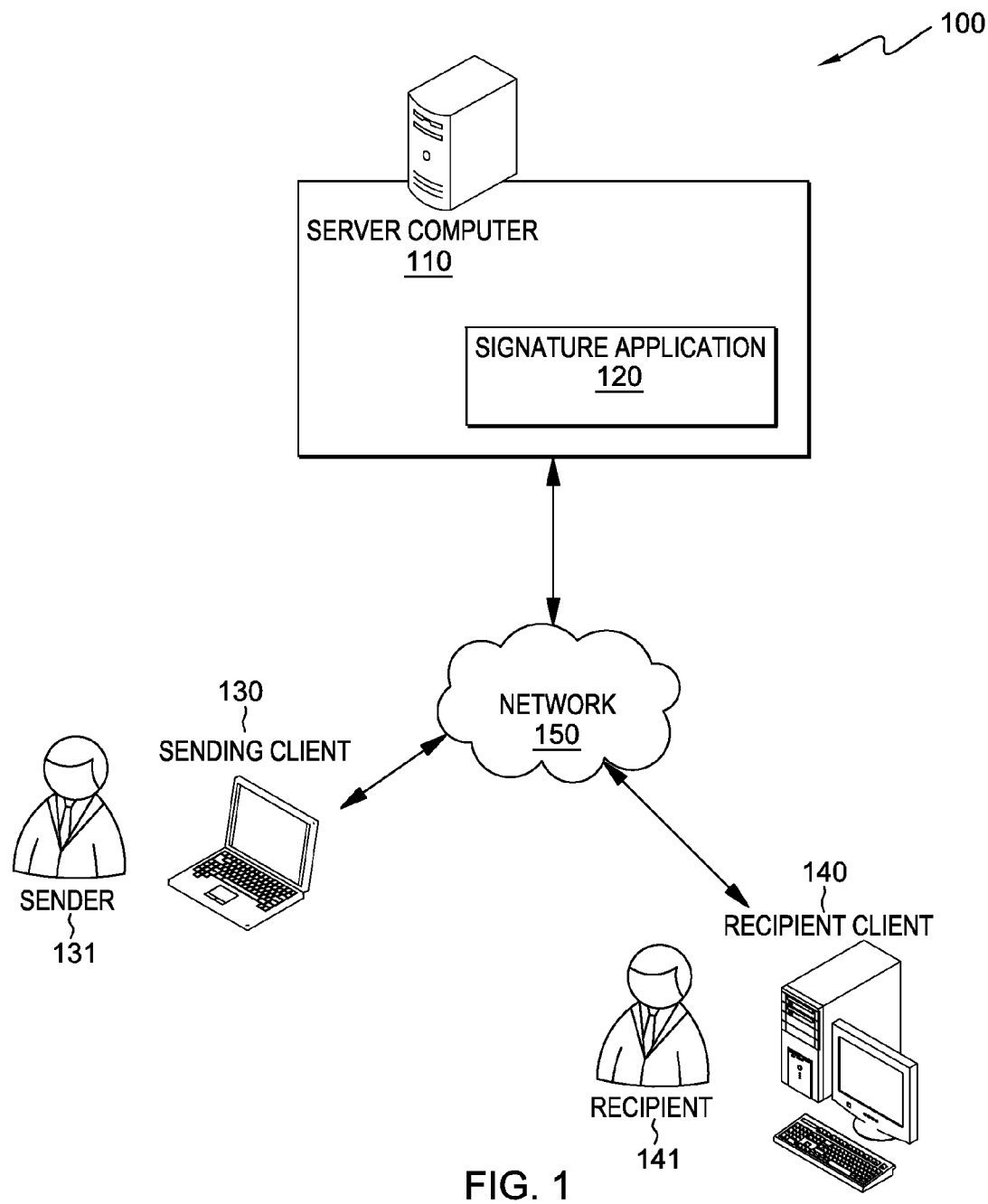
FIG. 1 illustrates a distributed client-server computing environment, in an embodiment in accordance with the present invention.

FIG. 1 illustrates a distributed client-server computing environment 100 in an embodiment in accordance with the present invention. Distributed client-server computing environment 100 comprises server computer 110. Server computer 110 is operationally coupled with signature application 120. Signature application 120, sending client 130, and recipient client 140 may communicate among each other via network 150.

It should be understood that in at least one embodiment in accordance with the present invention, signature application 120, sending client 130, and recipient client 140, in any combination, may reside within the same machine or may be operationally coupled to the same machine. In such an embodiment, communications among signature application 120, sending client 130, and recipient client 140 may not necessarily involve network 150. Sending client 130 and recipient client 140 interact with their respective users, sender 131 and recipient 141.

Sending client 130, recipient client 140, and server computer 110, each may be a mainframe computer, personal computer (PC), tablet computer, netbook computer, a personal digital assistant, a smart phone, or any device capable of performing their respective functions in embodiments in accordance with the present invention, including communicating with the others by any means, including via network 150.

Network 150 can be, for example, a local area network (LAN), a wide area network (WAN) such as the Internet, or a combination of the two, and can comprise any combination of wired, wireless, or fiber optic connections. In general, network 150 can be any combination of connections and transmission protocols that supports communications among server computer 110, sending client 130, and recipient client 140.

Figure 2:
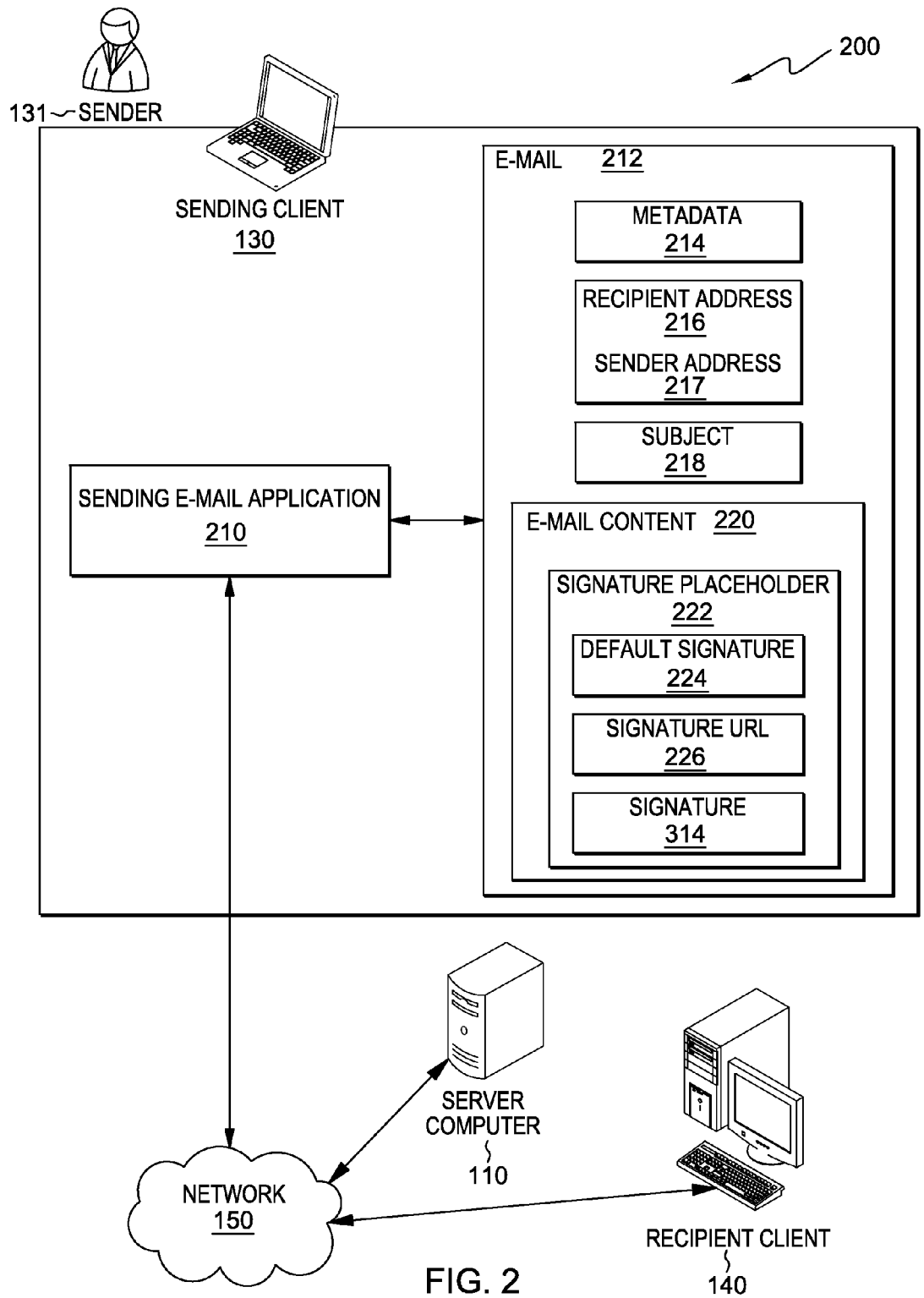
FIG. 2 is a block diagram of sending client 130 in an illustrative embodiment in accordance with the present invention.

FIG. 2 is a block diagram of sending client 130 in an illustrative embodiment in accordance with the present invention, generally designated with numeral 200. Sending client 130 is capable of performing the functions of sending e-mail application 210, which can create e-mail 212, and can transmit e-mail 212 to signature application 120, and to recipient client 140, via network 150 or other means. Sending e-mail application 210 is further capable of receiving signature URL 226 and inserting signature URL 226 into signature placeholder 222.

The term "URL" is understood to mean "Uniform Resource Locator", sometimes referred to as a "web address". A URL will be understood, by one skilled in the art, to be a unique address which can be resolved unambiguously to represent the storage location of an electronic file. In the context of this disclosure, signature URL 226, upon establishment, represents an association with e-mail 212, the association being established and maintained by signature application 120. Establishment of signature URL 226 and its association with e-mail 212 will be further described below with reference to FIGS. 3 and 6.

E-mail 212 includes at least one of metadata 214, recipient address 216, sender address 217, subject 218, e-mail content 220 and signature placeholder 222. Encompassed within signature placeholder 222, at various times, may be at least one of default signature 224, signature URL 226 or signature 314 in any combination. Further description of signature 314 is included below with reference to FIG. 5. Default signature 224 may comprise a preconfigured signature chosen by sender 131. Sender 131 may choose to leave default signature 224 blank, such that no content is displayed inside signature placeholder 222. One use of default signature 224, envisioned by embodiments in accordance with the present invention, is to provide content inside signature placeholder 222 in the event actions performed by embodiments in accordance with the present invention do not identify or produce a suitable signature 314.

Throughout this disclosure, signature placeholder 222 is understood either to be 1) a HyperText Markup Language (HTML) <iFrame> element or 2) an application or element embedded into e-mail 212, such application or element having a function similar to <iFrame> such as, for example, "AJAX" (Asynchronous JavaScript and XML), "Dojo widgets" (part of Dojo Toolkit) or "OpenSocial gadgets". One skilled in the relevant art will recognize HTML element <iFrame> as that defined by the World Wide Web Consortium, W3C. The phrase "having a function similar to <iFrame>" is understood to mean possessing the ability to display within e-mail 212, content distinct from the remainder of e-mail 212, such content, for purposes of this disclosure, being defined herein as signature 314. Signature 314 can comprise, for example, elements in the non-exhaustive list: Default signature 224, signature URL 226 or signature 314.

Default signature 224 and signature 314 can be text, image(s), multimedia content, or links to the foregoing or other content which signature placeholder 222 is capable of displaying.

Figure 3:
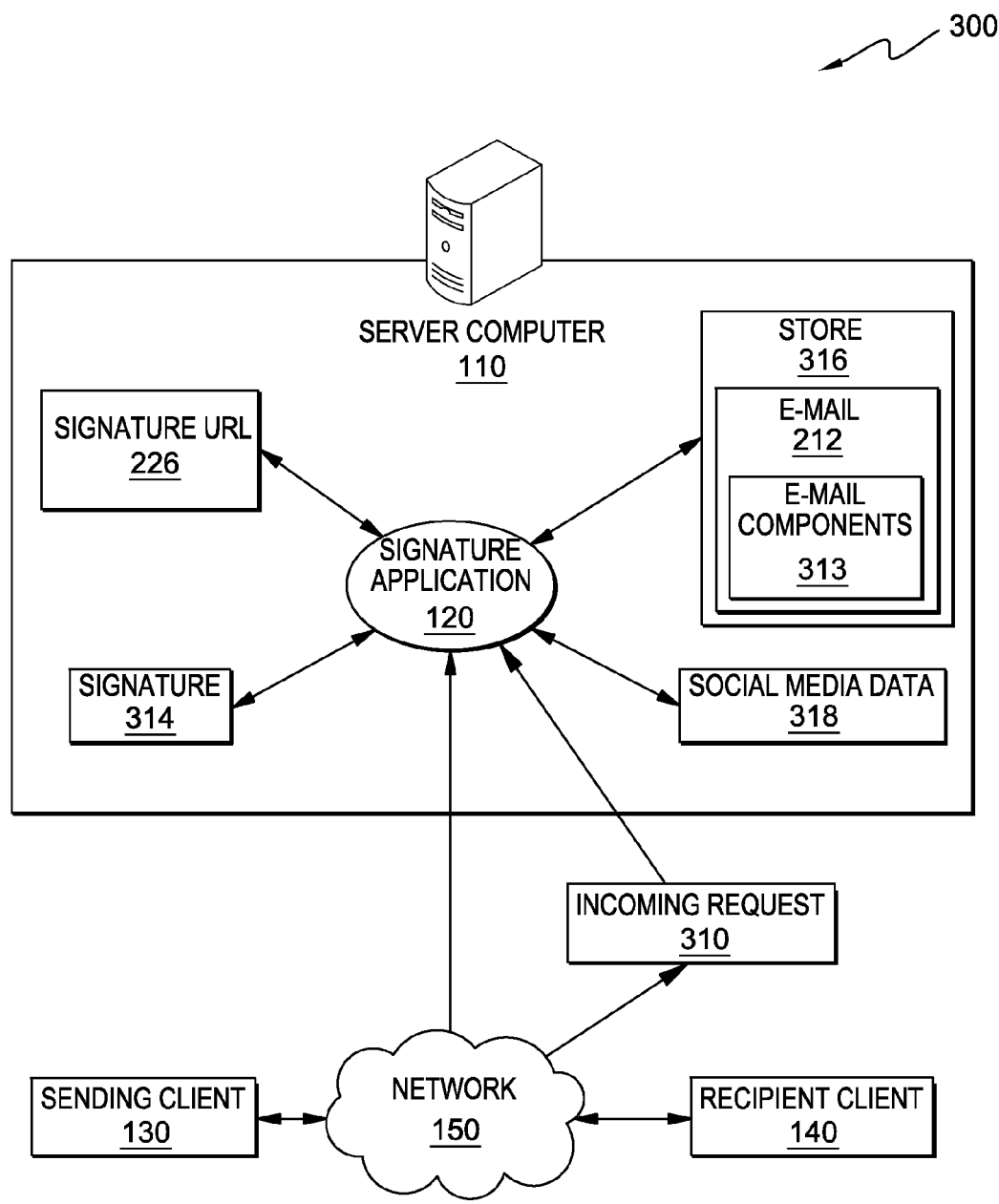
FIG. 3 is a block diagram representing server computer 110 in an embodiment in accordance with the present invention.

FIG. 3 is a block diagram representing server computer 110 in an embodiment in accordance with the present invention, generally designated with numeral 300. Signature application 120 is a computer program operationally coupled with server computer 110. Server computer 110 is any machine capable of performing functions of signature application 120 and capable of communicating with sending client 130 and with recipient client 140 via network 150 or other means.

Signature application 120 can read from and write to store 316, access social media data 318, receive incoming request 310, and determine signature 314.

Social media data 318 comprises an aggregation of recent social media activities of sender 131 and recipient 141. Included in social media data 318 may be recent communications between sender 131 and recipient 141, and degrees of separation between sender 131 and recipient 141.

E-mail components 313 comprises data associated with e-mail 212. More specifically, e-mail components 313 comprises at least one of metadata 214, recipient address 216, sender address 217, subject 218 and e-mail content 220. E-mail content 220 further comprises at least one of signature placeholder 222, default signature 224, signature URL 226, and signature 314.

Figure 4:
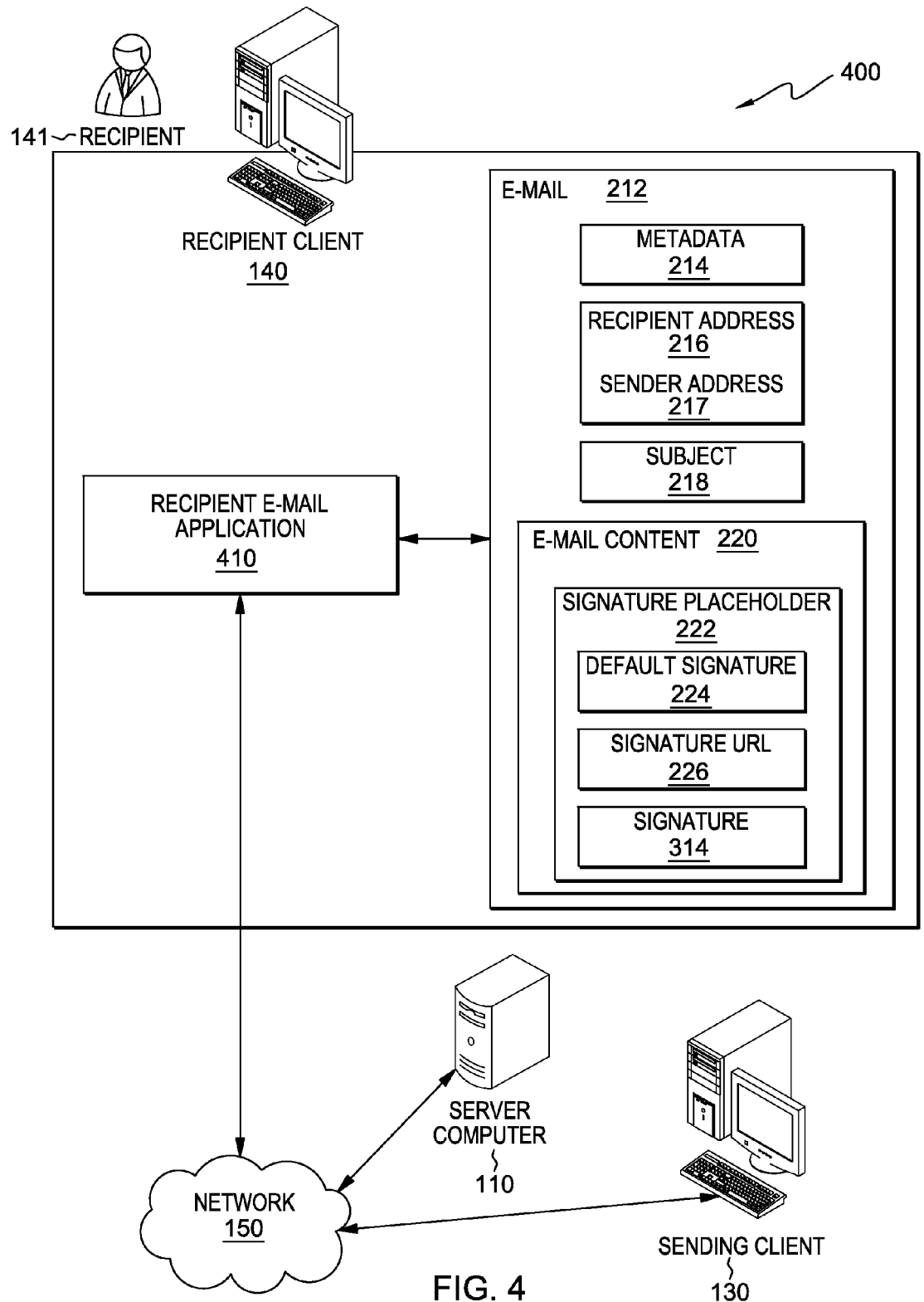
FIG. 4 is a block diagram representing recipient client 140 in an embodiment in accordance with the present invention.

FIG. 4 is a block diagram representing recipient client 140 in an embodiment in accordance with the present invention, generally designated with numeral 400. Recipient client 140 is capable of executing recipient e-mail application 410 including the ability to receive and display e-mail 212. Recipient client 140 can communicate with sending client 130 and signature application 120 via network 150 or other means.

Figure 5:
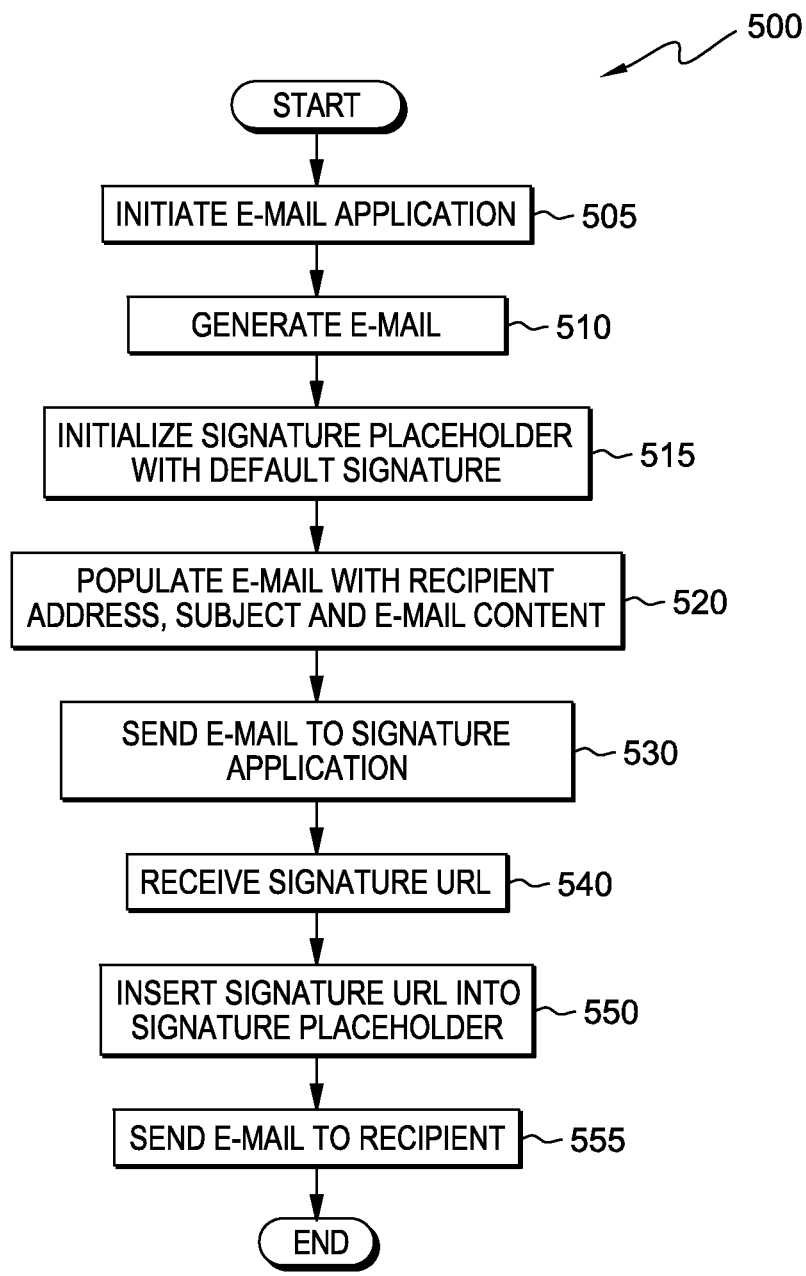
FIG. 5 is a flowchart depicting functions performed by sending client 130 when creating and sending e-mail 212 in an illustrative embodiment in accordance with the present invention.

FIG. 5 is a flowchart depicting functions performed by sending client 130 when creating and sending e-mail 212 in an illustrative embodiment in accordance with the present invention, generally designated with numeral 500. Sending client 130 initiates sending e-mail application 210 (step 505). Sending e-mail application 210 generates e-mail 212 including signature placeholder 222 within e-mail 212 (step 510). In some embodiments in accordance with the present invention, e-mail application 210 initializes signature placeholder 222 with default signature 224 (step 515).

E-mail application 210 receives recipient address 216, subject 218, and e-mail content 220 and populates their respective fields within e-mail 212 (step 520).

In response to a command to transmit e-mail 212 to recipient address 216, e-mail application 210 first sends e-mail 212 to signature application 120 (step 530). E-mail application 210 receives signature URL 226 (step 540) and inserts signature URL 226 into signature placeholder 222 (step 550). E-mail application 210 sends e-mail 212 to recipient address 216 (step 555).

Figure 6:
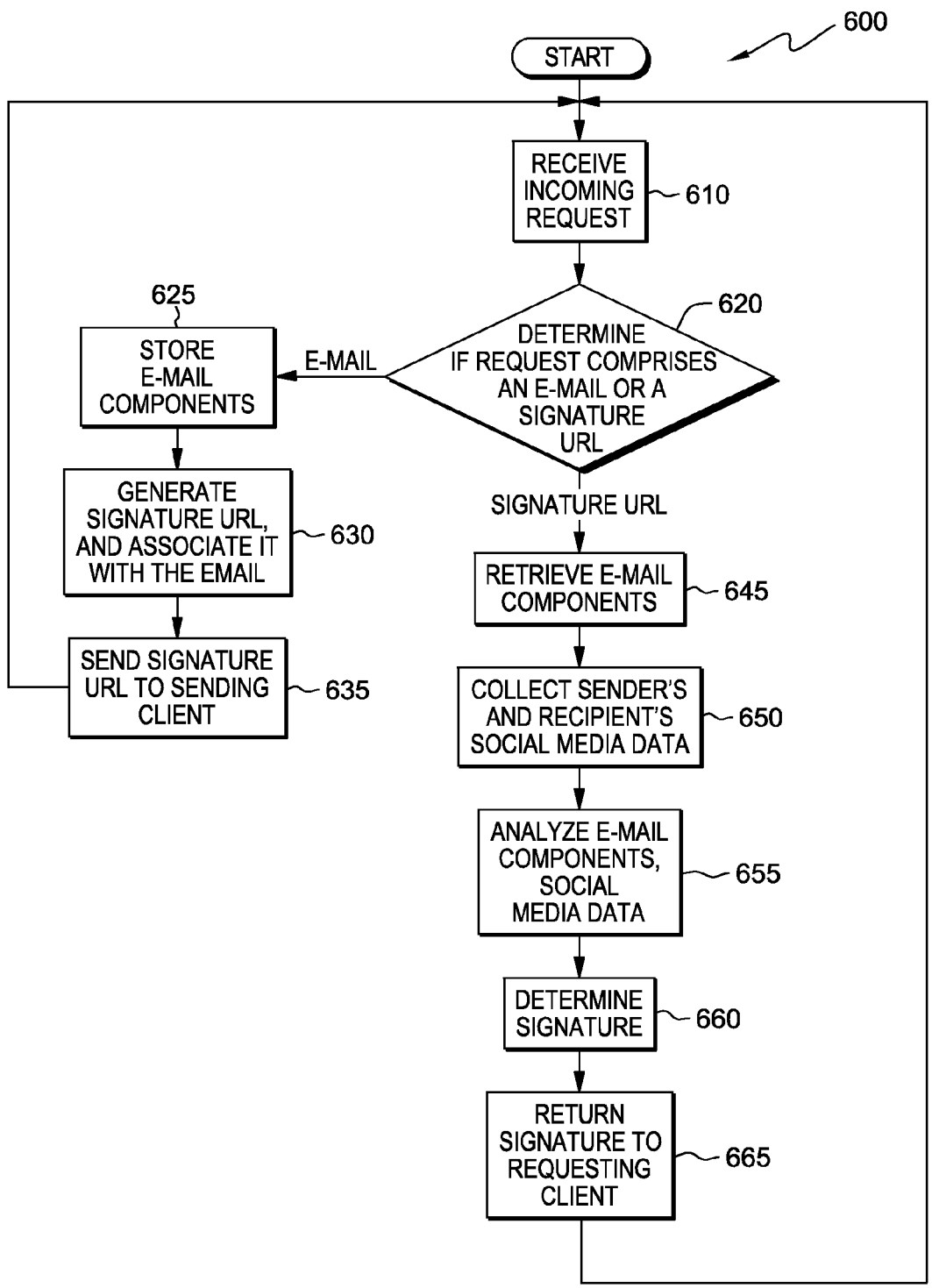
FIG. 6 is a flowchart depicting functions performed by signature application 120 in an example embodiment in accordance with the present invention.

FIG. 6 is a flowchart depicting functions performed by signature application 120 in an example embodiment in accordance with the present invention, generally designated with numeral 600. Signature application 120 receives incoming request 310 (step 610). Incoming request 310 can comprise e-mail 212 or a previously assigned signature URL 226. Signature application 120 determines whether incoming request 310 comprises e-mail 212 or signature URL 226 (decision 620).

In the event incoming request 310 comprises e-mail 212 (decision 620, "E-mail" branch), signature application 120 stores e-mail components 313, comprising at least one of metadata 214, recipient address 216, sender address 217, subject 218 and e-mail content 220, in store 316 (step 625). Signature application 120 generates signature URL 226, by establishing a file, within a file system managed by signature application 120, and assigning a filename to identify the file. Signature application 120 associates signature URL 226 with e-mail 212 (step 630) and sends signature URL 226 to sending client 130 (step 635). Associating signature URL 226 with e-mail 212 means that upon later receiving an HTTP request that includes signature URL 226 as the target address, signature application 120 can identify the specific e-mail (e-mail 212) with which signature URL 226 is associated, and more particularly can identify the storage addresses at which e-mail components 313 are stored.

In the event incoming request 310 comprises signature URL 226, where signature URL 226 had been previously associated with e-mail 212 (decision 620, "Signature URL" branch), signature application 120 retrieves e-mail components 313 from store 316 (step 645). Signature application 120 collects social media data 318, by searching social media sites for postings made by e-mail sender 131 and e-mail recipient 141, and for interactions between e-mail sender 131 and e-mail recipient 141, and retrieving such postings and interactions for analysis (step 650).

Signature application 120 analyzes social media data 318 and e-mail components 313 (step 655). The analysis may, among other things, identify commonalities among the aforementioned postings and interactions, and in part from these commonalities, derive signature 314 (step 660). Signature application 120 returns signature 314 to the requesting client (step 665). The requesting client may either be sending client 130 or recipient client 140.

Figure 7:
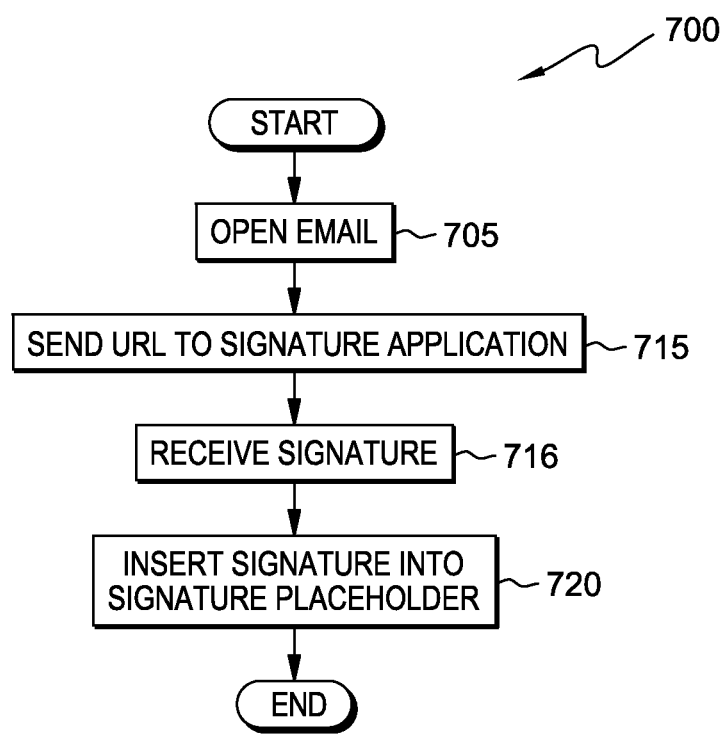
FIG. 7 is a flowchart depicting functions performed by recipient client 140 in an embodiment in accordance with the present invention.

FIG. 7 is a flowchart depicting functions performed by recipient client 140 in an embodiment in accordance with the present invention, generally designated with numeral 700. Recipient client 140 initiates recipient e-mail application 410, opens e-mail 212 (step 705) including signature placeholder 222 and, within signature placeholder 222, default signature 224 or signature URL 226. Recipient client 140 sends signature URL 226 to signature application 120 (step 715).

Responsive to receipt, by recipient client 140, of signature 314 (step 716), signature placeholder 222 displays signature 314 as content embedded in signature placeholder 222 (step 720). Aspects of standard browser and internet functionality are utilized in embodiments in accordance with the present invention.

Figure 8:
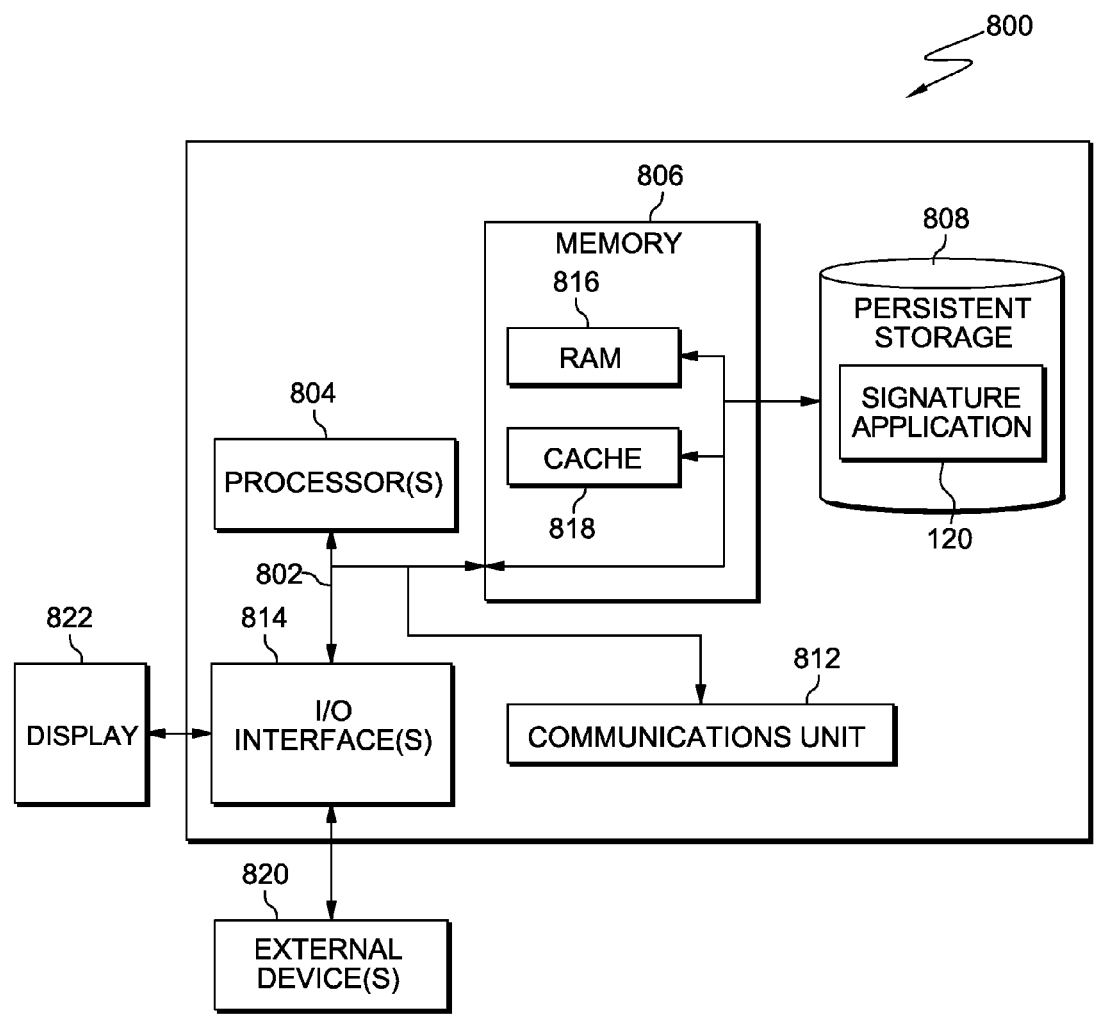
FIG. 8 is a block diagram depicting components comprising a server computer system, in an illustrative embodiment in accordance with the present invention.

FIG. 8 is a block diagram depicting components comprising a server computer system, in an illustrative embodiment in accordance with the present invention, generally designated with numeral 800. It should be appreciated that FIG. 8 illustrates only one implementation and does not imply any limitations with regard to the environments in which different embodiments in accordance with the present invention may be implemented. Many modifications to the depicted environment may be made. For example, server computer 110 may comprise such components spread through multiple systems and resources and may provide systems and resources beyond what is necessary to operate embodiments in accordance with the present invention.

Server computer 110 includes communications fabric 802, which provides communications between computer processor(s) 804, memory 806, persistent storage 808, communications unit 812, and input/output (I/O) interface(s) 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In this embodiment in accordance with the present invention, memory 806 includes (random access memory) RAM 816 and cache memory 818. In general, memory 806 can include any suitable volatile or non-volatile computer readable storage medium.

Signature application 120 is stored in persistent storage 808 for execution by one or more of computer processor(s) 804 via one or more memories of memory 806. In this embodiment in accordance with the present invention, persistent storage 808 can include any combination of computer readable media. The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

I/O interface(s) 814 allows for input and output of data with other devices that may be connected to data processing system 800. For example, I/O interface 814 may provide a connection to external devices 820 such as a keyboard, keypad, a touch screen, and/or some other suitable input device. External devices 820 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 808 via I/O interface(s) 814. I/O interface(s) 814 may also connect to a display 822. Display 822 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing a recipient of an e-mail a dynamic, intelligent e-mail signature wherein the e-mail signature is generated, when a recipient views the e-mail and each time the recipient subsequently re-views the e-mail, based on a Uniform Resource Locator (URL), embedded in the e-mail, representing the e-mail signature, the method comprising:

receiving, by a signature application, an e-mail from a sender;

storing, by the signature application, components of the e-mail for later retrieval;

assigning, by the signature application, a Uniform Resource Locator (URL) representing an e-mail signature;

associating, by the signature application, the URL with the e-mail;

transmitting, by the signature application, the URL toward the sender for use as the e-mail signature;

receiving, by the signature application, the URL from a recipient of the e-mail each time the recipient views the e-mail;

retrieving, by the signature application, based on the URL, the components of the e-mail;

retrieving, by the signature application, social media activities of the sender and social media activities of the recipient, at the time the URL is received;

creating, by the signature application, signature content based on at least one of the components of the e-mail, and at least one of the social media activities of the sender and the social media activities of the recipient, at the time the URL is received;

creating, by the signature application, an e-mail signature based on the signature content; and sending, by the signature application, the e-mail signature toward the recipient for display during the viewing of the e-mail.

2. The method in accordance with claim 1, wherein receiving, by the signature application, an e-mail from a sender further comprises:

receiving an e-mail from a sender, the e-mail including a signature placeholder, wherein the signature placeholder forms a portion of a body of the e-mail and the signature placeholder displays content distinct from a remaining portion of the e-mail body.

3. The method in accordance with claim 1, wherein storing, by the signature application, the e-mail for later retrieval further comprises:

storing e-mail components for later retrieval wherein the e-mail components include one or more of e-mail content, sender address, recipient address, and e-mail metadata.

4. The method in accordance with claim 1, wherein assigning, by the signature application, a URL representing an e-mail signature further comprises:

creating a file within a file system managed by the one or more processors, assigning a filename to the file, and generating a URL identifying a storage location represented by the filename.

5. The method in accordance with claim 1, wherein associating, by the signature application, the URL with the e-mail further comprises:

associating the URL with storage addresses of stored components of the e-mail, such that the stored components of the e-mail may be retrieved by reference to the URL.

6. The method in accordance with claim 1, wherein retrieving, by the signature application, social media activities of the sender and social media activities of the recipient further comprises:

searching social media sites, for postings made by the e-mail sender and the e-mail recipient, and for interactions between the e-mail sender and the e-mail recipient, and retrieving such postings and interactions for analysis.

7. The method in accordance with claim 1, wherein creating, by the signature application, signature content based on at least one of the components of the e-mail, and at least one of the social media activities of the sender and the social media activities of the recipient, further comprises:

identifying commonalities among, at least, the sender's and recipient's social media activities, and at least one of the e-mail components.

8. A computer program product for providing a dynamic, intelligent e-mail signature wherein the e-mail signature is generated, when a recipient views the e-mail and each time the recipient subsequently re-views the e-mail, based on a Uniform Resource Locator (URL), embedded in the e-mail, representing the e-mail signature, the computer program product comprising:

one or more non-transitory computer readable storage media; and program instructions stored on at least one of the one or more non-transitory computer readable storage media, the program instructions comprising:

program instructions to receive an e-mail from a sender;

program instructions to store components of the e-mail for later retrieval;

program instructions to assign a Uniform Resource Locator (URL) representing an e-mail signature;

program instructions to associate the URL with the e-mail; and program instructions to transmit the URL toward the sender for use as an email signature;

program instructions to receive the URL from a recipient of the e-mail each time the recipient views the e-mail;

program instructions to retrieve, based on the URL, the components of the e-mail;

program instructions to retrieve social media activities of the sender and social media activities of the recipient, at the time the URL is received;

program instructions to create signature content based on at least one of the components of the e-mail, and at least one of the social media activities of the sender and the social media activities of the recipient, at the time the URL is received;

program instructions to create an e-mail signature based on the signature content; and program instructions to send the e-mail signature toward the recipient for display during the viewing of the e-mail.

9. The computer program product in accordance with claim 8, wherein program instructions to receive an e-mail from a sender further comprise:

program instructions to receive an e-mail from a sender, the e-mail including a signature placeholder, wherein the signature placeholder forms a portion of a body of the e-mail and the signature placeholder displays content distinct from a remaining portion of the e-mail body.

10. The computer program product in accordance with claim 8, wherein program instructions to store the e-mail for later retrieval further comprise:

program instructions to store e-mail components, for later retrieval, wherein the e-mail components include one or more of e-mail content, sender address, recipient address, and e-mail metadata.

11. The computer program product in accordance with claim 8, wherein assigning, by one or more processors, a URL representing an e-mail signature further comprises:

program instructions to create a file, within a file system managed by the one or more processors, assigning a filename to the file, and generating a URL identifying a storage location represented by the filename.

12. The computer program product in accordance with claim 8, wherein associating, by one or more processors, the URL with the e-mail further comprises:

program instructions to associate the URL with storage addresses of stored components of the e-mail, such that the stored components of the e-mail may be retrieved by reference to the URL.

13. The computer program product in accordance with claim 8, wherein program instructions to retrieve social media activities of the sender and social media activities of the recipient, further comprises:
    program instructions to search social media sites, for postings made by the sender and the recipient, and for interactions between the sender and the recipient, and retrieving the postings and the interactions for creating signature content.

14. The computer program product in accordance with claim 8, wherein the program instructions to create signature content, further comprises:
    program instructions to identify commonalities among, at least, the social media activities of the sender and the social media activities of the recipient, and at least one of the e-mail components.

15. A computer system for providing a dynamic, intelligent e-mail signature wherein the e-mail signature is generated, when a recipient views the e-mail and each time the recipient subsequently re-views the e-mail, based on a Uniform Resource Locator (URL), embedded in the e-mail, representing the e-mail signature, the computer system comprising:
    one or more computer processors;
    one or more non-transitory computer readable storage media;
    program instructions stored on at least one of the one or more non-transitory computer readable storage media, the program instructions comprising:
        program instructions to receive an e-mail from a sender;
        program instructions to store components of the e-mail for later retrieval;
        program instructions to assign a Uniform Resource Locator (URL) representing an e-mail signature;
        program instructions to associate the URL with the e-mail; and
        program instructions to transmit the URL toward the sender for use as an email signature;
        program instructions to receive the URL from a recipient of the e-mail each time the recipient views the e-mail;
        program instructions to retrieve, based on the URL, the components of the e-mail;
        program instructions to retrieve social media activities of the sender and social media activities of the recipient, at the time the URL is received;
        program instructions to create signature content based on at least one of the components of the e-mail, and at least one of the social media activities of the sender and the social media activities of the recipient, at the time the URL is received;
        program instructions to create an e-mail signature based on the signature content; and
        program instructions to send the e-mail signature toward the recipient for display during the viewing of the e-mail.

16. The computer system in accordance with claim 15, wherein program instructions to assign a URL representing an e-mail signature, further comprises:
    program instructions to create a file, within a file system managed by the one or more processors, assigning a filename to the file, and generating a URL identifying a storage location represented by the filename.

17. The computer system in accordance with claim 15, wherein the program instructions to create signature content, further comprises:
    program instructions to identify commonalities among, at least, the social media activities of the sender and the social media activities of the recipient, and at least one of the e-mail components.

\* \* \* \* \*